(12) United States Patent
Kobayashi et al.

(10) Patent No.: US 6,730,390 B1
(45) Date of Patent: May 4, 2004

(54) ELASTICALLY STRETCHABLE COMPOSITE SHEET

(75) Inventors: Toshio Kobayashi, Kagawa-ken (JP); Satoru Tange, Kagawa-ken (JP); Koichi Yamaki, Kagawa-ken (JP)

(73) Assignee: Uni-Charm Corporation, Kawanoe (JP)

( * ) Notice: Subject to any disclaimer, the term of this patent is extended or adjusted under 35 U.S.C. 154(b) by 127 days.

(21) Appl. No.: 09/613,814

(22) Filed: Jul. 11, 2000

(30) Foreign Application Priority Data

Jul. 12, 1999 (JP) ............................. 11-198159
Jun. 5, 2000 (JP) ........................ 2000-168303

(51) Int. Cl.$^7$ .............................. B32B 5/08; B32B 5/26
(52) U.S. Cl. .................... 428/198; 428/196; 428/219; 428/315.9; 428/340; 442/328; 442/329; 442/389; 442/394; 156/291
(58) Field of Search ................ 442/328, 329, 442/389, 394; 428/196, 198, 340, 315.9, 219; 156/291

(56) References Cited

U.S. PATENT DOCUMENTS 5,681,645 A  * 10/1997  Strack et al. ............... 428/196

FOREIGN PATENT DOCUMENTS

WO          96/38620       12/1996

* cited by examiner

Primary Examiner—Elizabeth M. Cole
Assistant Examiner—John J. Guarriello
(74) Attorney, Agent, or Firm—Lowe Hauptman Gilman & Berner LLP

(57) ABSTRACT

An elastically stretchable composite sheet including an elastic sheet and a fibrous assembly. A fibrous assembly having an inelastic extensibility is bonded to at least one surface of an elastic sheet at intermittently arranged bond regions to form a composite sheet. Component fibers constituting the fibrous assembly are long fibers continuously extending and describing curves between each pair of adjacent bond regions.

28 Claims, 7 Drawing Sheets

ELASTICALLY STRETCHABLE COMPOSITE SHEET

BACKGROUND OF THE INVENTION

This invention relates to an elastically stretchable composite sheet and more particularly to such a composite sheet comprising an elastic sheet and a sheet-like fibrous assembly.

It is well known to bond elastically stretchable nonwoven fabrics to an elastically stretchable sheets made of plastic elastomer or the like and thereby to convert a rubber-like touch intrinsic to the elastically stretchable sheet to a cloth-like touch. For example, in order to provide a liquid-impervious backsheet of a disposable diaper with an elastic stretchability, it is also well known to laminate an elastically stretchable nonwoven fabric on a liquid-impervious and elastically stretchable sheet.

In the composite sheet obtained by such a lamination, staple fibers each having a fiber length of about 50 mm have usually been used. Such composite sheet has had a problem that the staple fibers entangled together and forming the nonwoven fabric would be progressively disentangled one from another as the composite sheet is stretched. As a result, a proper structure of the nonwoven fabric as well as a proper structure of the composite sheet would be impaired and/or become fluffy unless entanglement spots of fibers and/or bond regions between the nonwoven fabric and the elastically stretchable sheet are distributed as densely as possible. However, the spots and/or the bond regions densely distributed will make it difficult to obtain a composite sheet having a high elastically stretchability.

SUMMARY OF THE INVENTION

An object of the invention is to eliminate or minimize factors impairing a stretchability of an elastically stretchable composite sheet and thereby to achieve its stretchability as high as possible.

According to this invention, there is provided an elastically stretchable composite sheet comprising an elastic sheet having a stretchability in two directions orthogonal to each other and a sheet-like fibrous assembly having an extensibility in the two direction bonded to at least one surface of the elastic sheet, wherein: the fibrous assembly has a inelastic extensibility, the elastic sheet and the fibrous assembly are bonded together at bond regions arranged intermittently in the two directions and component fibers constituting the fibrous assembly are long fibers continuously extending and describing curves between each pair of adjacent bond regions in which the long fibers are bonded to the elastic sheet.

The elastically stretchable composite sheet according to this invention enables the elastic sheet and the fibrous assembly to be reliably held in their condition bonded with each other even if the bond regions in which these elastic sheet and fibrous assembly are bonded with each other. This is for the reason that the extensible fibrous assembly laminated at least one surface of the elastic sheet comprises the continuous fibers. With the composite sheet obtained in this manner, its stretchability is not affected by the bond regions arranged at close intervals as they have conventionally been the case. The composite sheet of this invention is stretchable but offers a cloth-like comfortable touch by the presence of the continuous fibers. Therefore, this composite sheet is suitable as the stock material for garments such as disposable diapers, sanitary napkins or disposable gowns.

DETAILED DESCRIPTION OF THE PREFERRED EMBODIMENTS

Details of an elastically stretchable composite sheet according to this invention will be more fully understood from the description given hereunder with reference to the accompanying drawings.

Figure 1:
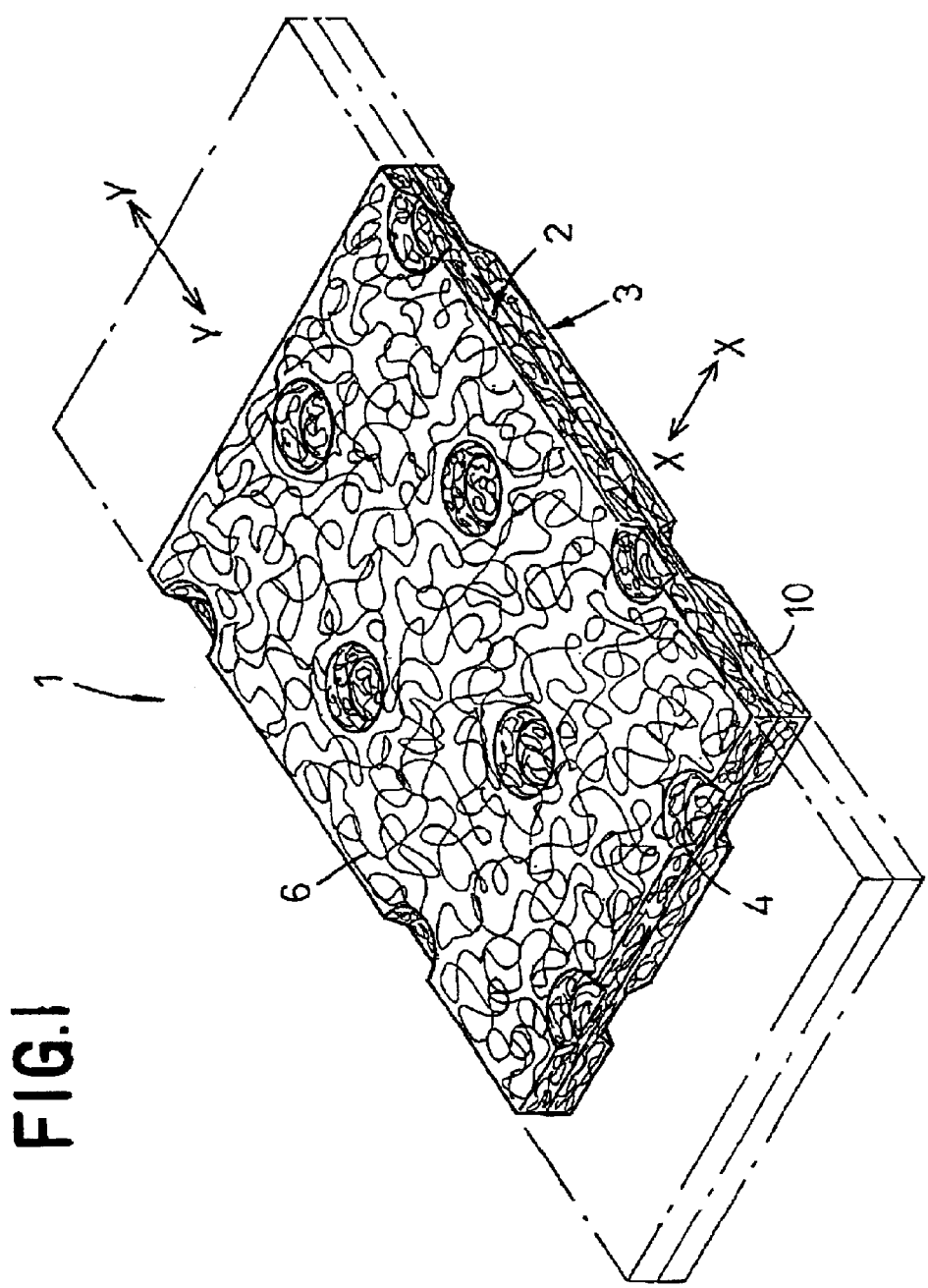
FIG. 1 is a perspective view showing an elastically stretchable composite sheet according to this invention.

An elastically stretchable composite sheet 1 shown by FIG. 1 in a perspective view comprises an upper layer 2 and a lower layer 3 bonded together at their bond regions 4. The composite sheet 1 is elastically stretchable and contractable at least in a direction represented by a double-headed arrow Y—Y rather than in a direction indicated by a double-headed arrow X—X being orthogonal to the direction Y—Y, as indicated by imaginary lines.

The upper layer 2 of the composite sheet 1 is inelastically stretchable at least in the direction Y—Y rather than in the direction X—X. This upper layer 2 is an assembly of long, preferably, continuous thermoplastic synthetic resin fibers 6 which continuously extend in a region defined around the bond regions 4. The fibers 6 are sealed with one another only at the bond regions 4 and neither sealed nor bonded together, i.e., separated one from another in the region defined around the bond regions 4. Between each pair of the adjacent bond regions, the. continuous fibers 6 extend over the upper surface of the lower layer 3 along irregular curves. As the composite sheet 1 is stretched in the direction Y—Y and/or in the direction X—X, the curved continuous fibers 6 are reoriented to extend in the direction Y—Y and/or in the direction X—X and the upper layer 2 is inelastically stretched. Such continuous fibers 6 may be of inelastic synthetic resin such as polypropyrene, ethylene-propyrene random copolymer, ethylene-propyrene-butene random copolymer, polyester or polyethylene. Each of the continuous fibers 6 preferably have a diameter of 0.1–50 μm.

The lower layer 3 of the composite sheet 1 comprises a sheet which is elastically stretchable in the direction Y—Y, preferably both in the direction Y—Y and in the direction X—X. This sheet has a stretch ratio of at least 200%, preferably at least 400% in the direction Y—Y and elastically contractile again to less than 1.3 times of its initial length after stretched by 100%. Such sheet may be a fibrous assembly comprising continuous elastic fibers made of thermoplastic elastomer, a nonwoven fabric comprising the continuous fibers mechanically entangled or bonded with together or a film made of thermoplastic elastomer. The film, if it is used, may be moisture-permeable or moisture-impermeable. The sheet is exemplarily shown in the form of nonwoven fabric comprising continuous fibers 10.

The continuous fibers or film constituting the lower layer 3 may be made of block copolymerized polyester comprising hard and soft ingredients. The continuous fibers made of such polyester is able to cope with an environmental condition with its high moisture absorption as well as its high moisture permeability comparable to those of natural fibers. Therefore, the composite sheet 1 comprising such continuous fibers is suitable as stock material for garments such as disposable gowns. The film made of such polyester is also adequately moisture-permeable and the composite sheet 1 using the film is suitable as stock material for liquid-impervious backsheets of disposable body fluid absorbent articles such as disposable diapers or sanitary napkins. For such application of the film, its hard and soft ingredients are combined so that the film may have a moisture permeability of at least 1000 g/m$^2$/24 hrs. as measured in accordance with the prescription of JIS (Japanese Industrial Standards) Z 0208 and a water pressure resistance of at least 1 m, preferably at least 2 m as measured in accordance with the prescription of JIS L 1092. An example of the film useful to make the composite sheet 1 is a product of Toyobo Co., Ltd. put on the market under a trade name of PELPRENE P30B. The testing methods used in JIS Z 0208 and JIS L 1092 will be described herein below with reference to FIGS. 6 and 7.

The hard ingredient is preferably polyester presenting a glass transition temperature of 50° C. or higher which is obtained from dicarboxylic acid and diol. At least one of dicarboxylic acid and diol preferably includes an aromatic ring. The dicarboxylic acid includes aromatic dicarboxylic acid such as phthalic acid, terephthalic acid, isophthalic acid, 2,6-naphtalene dicarboxylic acid, 1,5-naphtalene dicarboxylic acid, Biphenyl-4,4'-naphtalene dicarboxylic acid, 3,3'-dimethyldiphenyl-4,4'-dicarboxylic acid, 4,4'-diphenylsulfonedicarboxylic acid, and 4,4'-diphenoxyethanedicarboxylic acid; aliphatic dicarboxylic acid such as succinic acid, oxalic acid, adipic acid, sebacic acid and dodecane diacid; and alicyclic dicarboxylic acid such as 1,4-cyclohexanedicarboxylic acid and decahydronaphthalene 2,6-dicarboxylic acid.

The soft ingredient is preferably polyether, aliphatic polyester or copolymer of polyether and aliphatic polyester, which presents a glass transition temperature lower than 20° C. Polyether includes polyethylene glycol, poly (ethylene/propylene) block polyglycol, polytetramethylene glycol and polyhexamethylene glycol; and the aliphatic polyester includes polyethylene adipate, polybutylene adipate and polycaprolactone.

These upper and lower layers 2, 3 may be bonded together at the bond regions 4 by heating them together under a pressure or by ultrasonic-sealing them with each other. If a technique of mechanical entanglement is also useful to bond the continuous fiber 6 of the upper layer 2 with the construction of the lower layer 3, such mechanical entangling effect may be achieved by means of needle punching, high pressure columnar water streams or the like. Preferably, each of the bond regions 4 has an area of 0.03–10 mm$^2$ and a total area of the bond regions 4 occupies 1–50% of the composite sheet's area.

Pulling the composite sheet 1, for example, in the direction Y—Y causes the lower layer 3 to be elastically stretched in the direction Y—Y. Stretching of the lower layer 3, in turn, causes the curved continuous fibers 6 of the upper layer to be reoriented and thereby to be inelastically stretched in the direction Y—Y. Before the curved continuous fibers 6 are completely straightened, a force required to stretch the composite sheet 1 substantially corresponds to a force required to stretch the lower layer 3 alone. The upper layer 2 has little influence upon the force required to stretch the composite sheet 1 since no significant force is required for the upper layer 2 to reorient its continuous fibers 6. Further pulling the composite sheet 1 causes the curved continuous fibers 6 to be further reoriented and thereby to be straightened in the region extending between each pair of the adjacent bond regions 4. To stretch the composite sheet 1 further from such condition, a force is required, in addition to the force required to stretch the lower layer 3 alone, to stretch the straightened continuous fibers 6. The continuous fibers 6 do not prevent the lower layer 3 from being smoothly stretched also in the direction X—X so far as the continuous fibers 6 maintains their curves. The continuous fibers 6 preferably describe loops in the plane of the composite sheet 1 to obtain the isotropic composite sheet 1 which is elastically stretched equally in the direction Y—Y and in the direction X—X at least by 20%.

Figure 2:
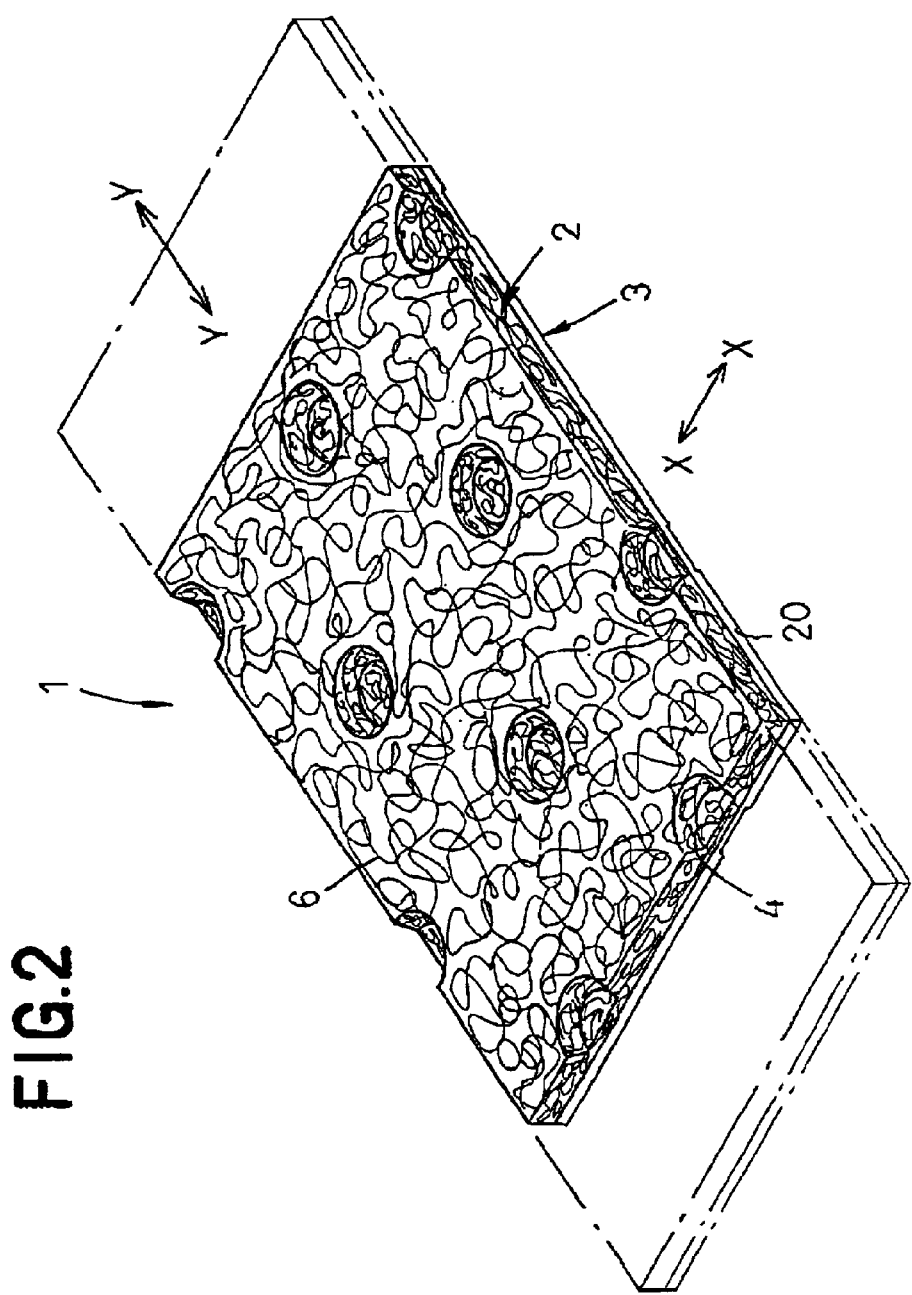
FIG. 2 is a view similar to FIG. 1 but showing one embodiment of this invention.

FIG. 2 is a view similar to FIG. 1 but showing one preferred embodiment of this invention. The composite sheet 1 according to this alternative embodiment, the lower layer 3 is formed by film 20 having an elastic stretchability in the direction Y—Y or both in the direction Y—Y and in the direction X—X. The upper layer 2 and the lower layer 3 are bonded with each other at the bond regions 4.

Figure 3:
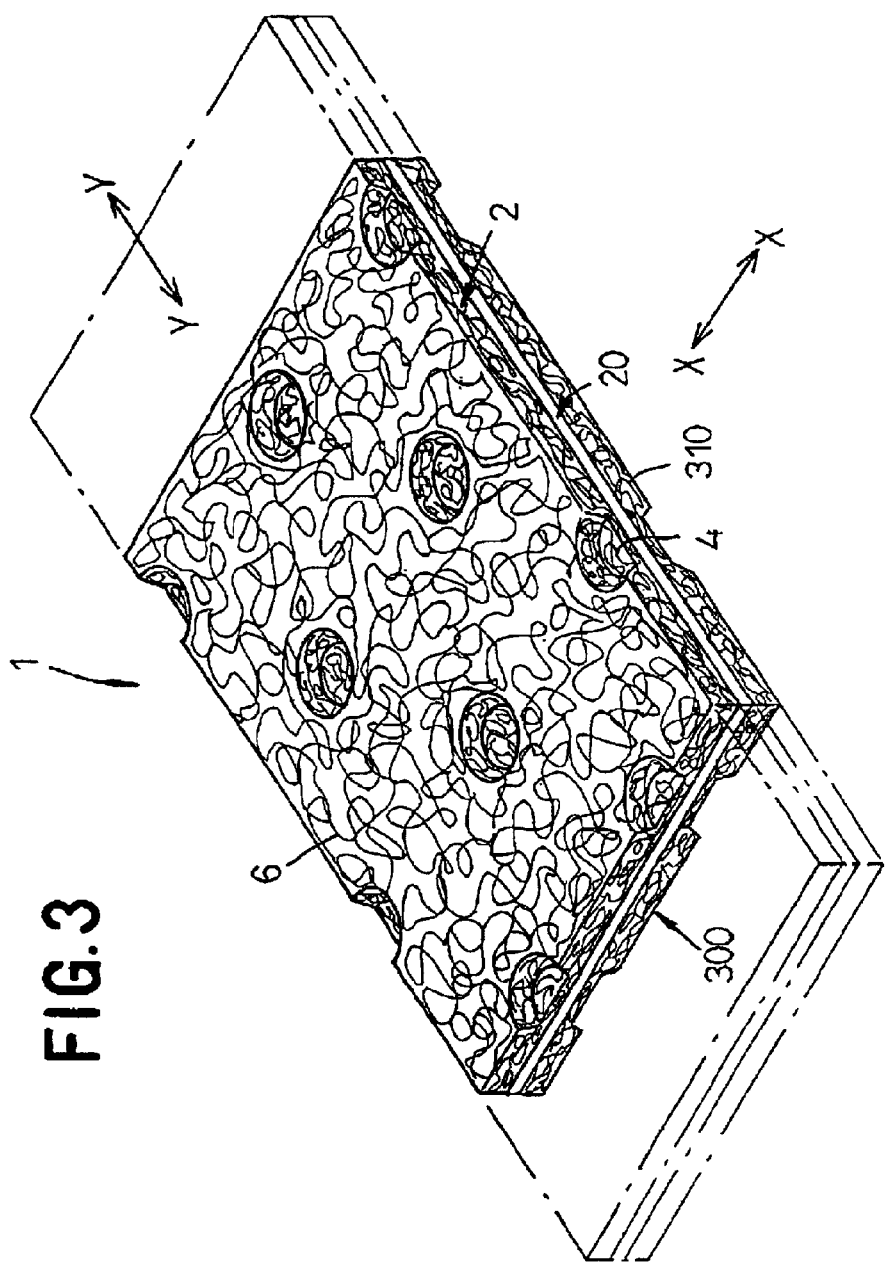
FIG. 3 is a view similar to FIG. 1 but showing another embodiment of this invention.

FIG. 3 also is a view similar to FIG. 1 but showing another preferred embodiment of this invention. In the case of this composite sheet 1, the lower layer 3 in the form of the film 20 is formed on its lower surface with a third layer 300 which is elastically or inelastically stretchable similarly to the upper layer 2. These upper and lower layers 2, 3 and the third layer 300 are bonded together at the bond regions 4. The third layer 300 is an assembly of continuous fibers 310 made of thermoplastic synthetic resin and the fibers 310 are preferably bonded together at the bond regions 4 but neither sealed nor bonded together between each pair of the adjacent bond regions 4. Between each pair of the adjacent bond regions 4, the continuous fibers 310 extend on the lower surface of the lower layer 3 along curves, preferably along loops in the plane of the composite sheet 1. As the composite sheet 1 is stretched, the third layer 300 is also inelastically stretched in the same manner as the upper layer 2. The continuous fibers 310 may be of the same material as the continuous fibers 6.

According to this invention, it is also possible to obtain the three-layered sheet as shown in FIG. 3 from the composite sheet 1 of FIG. 1. For example, the lower layer 3 of the composite sheet 1 of FIG. 1 is formed on its lower surface with the third layer 300 which is, in turn, bonded to the lower layer 3 at the bond regions 4.

Figure 4:
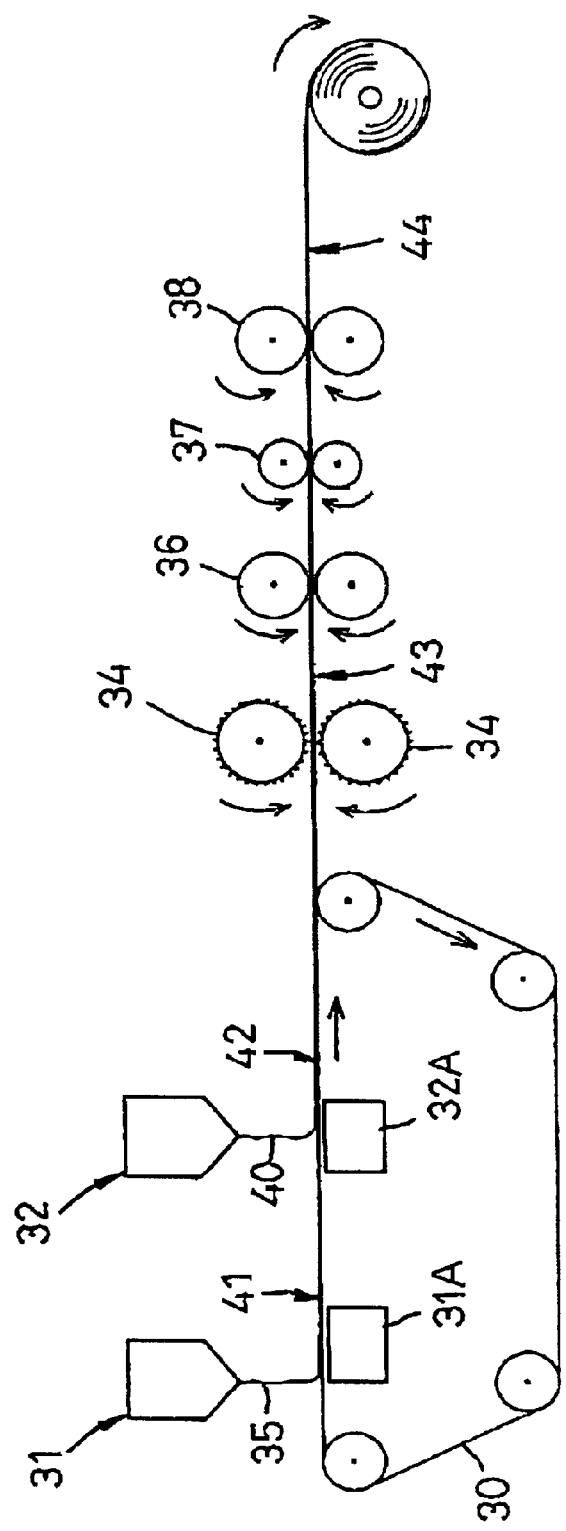
FIG. 4 is a diagram schematically illustrating an example of the process for making the composite sheet.

FIG. 4 is a diagram schematically illustrating an example of the process for making the composite sheet. An endless belt 30 travels from the left hand toward the right hand as viewed in the diagram. On the left hand, there is provided a first melt blown fiber molder 31 above the belt 30 below which there is provided a suction mechanism 31A. The first molder 31 includes a plurality of nozzles arranged transversely of the belt 30 and adapted to discharge first melt blown continuous fibers 35 of non-stretchable thermoplastic synthetic resin. The continuous fibers 35 are accumulated on the belt 30 along irregular curves to forma first web 41. For the first web 41, a discharge condition of the first molder 31 and a travelling condition of the belt 30 are selected so that the continuous fibers 35 stacked one upon another in the first web 41 may be prevented from being bonded together or, even if sealed together, these sealed continuous fibers 35 may be easily separated one from another on the subsequent step. The first continuous fibers 35 have a breaking extension of at least 70%.

On the right side of the first molder 31, there are provided a second melt blown fiber molder 32 and a suction mechanism 32A. The second molder 32 also includes a plurality of nozzles arranged transversely of the belt 30 and adapted to discharge second melt blown continuous fibers 40 of elastically stretchable thermoplastic synthetic resin. The second melt blown continuous fibers 40 are accumulated on the first web 31 along irregular curves to form a second web 42: A discharge condition of the second molder 32 is selected so that these second continuous fibers 40 stacked one upon another may be sealed together and thereby form a sheet having an elastic stretchability in the travelling direction of the belt 30, preferably in the travelling direction as well as in the direction being orthogonal thereto. Such second continuous fibers 40 have a breaking extension higher than that of the first continuous fibers 35.

The first and second webs 41, 42 placed upon each other are now fed together to vertically paired embossing rolls 34, 34. The webs 41, 42 are thereby heated under a pressure at the bond regions arranged intermittently at least in the longitudinal direction corresponding to the direction in which these webs 41, 42 are fed rather than in the direction orthogonal to the longitudinal direction. In this manner, the webs 41, 42 are bonded together to form a first composite web 43.

The first composite web 43 travels through first, second and third pairs of stretching rolls 36, 37, 38. The first and third pairs of rolls 36, 38 rotate at the same speed but this speed is lower than a revolution speed of the second pair of rolls 37. A difference of the revolution speeds between the first pair of rolls 36 and the second pair of rolls 37 is adjusted so that the first composite web 43 may be stretched at a room temperature of 10–60° C., preferably at a room temperature of 15–40° C. by a desired stretch ratio. After stretched, the first composite web 43 elastically contracts to its initial length between the second and third pairs of rolls 37, 38 to form a second composite web 44.

On the step of stretching the first composite web 43, the first continuous fibers 35 are longitudinally stretched diameter-reduced under a plastic deformation within its critical breaking extension between each pair of the adjacent bond regions in which the first and second webs 41, 42 have been bonded together. The second web 42 comprising the second continuous fibers 37 are elastically stretched within its critical elasticity between each pair of the adjacent bond regions. On the step of stretching the first composite web 43, except the bond regions in which the two webs are bonded together by the pair of embossing rolls 34, it is desirable that any bonded or mechanically entangled spots possibly having been formed among the first continuous fibers 35 of the first web 41 can be substantially loosened or disentangled. It is also desirable that bonded spots possibly having been formed between the first continuous fibers 35 and the second web 42 can be practically eliminated. The first composite web 43 preferably has a stretch ratio of 50–300%.

The second composite web 44 is taken up in the form of a roll and subsequently is cut into a desired dimension to obtain the individual composite sheet 1. The first and second webs 41, 42 in the second composite web 44 correspond to the upper and lower layers 2, 3 in the composite sheet 1 of FIG. 1, respectively. Portions of the second composite web 44 bonded by the pair of embossing rolls 34 correspond to the bond regions 4 of the composite sheet 1.

Both the first and second webs 41, 42 are formed by the continuous fibers and, even when the bond regions are arranged at relatively wide intervals, these two webs 41, 42 can be reliably held together. By arranging the bond regions at relatively wide intervals, a desired stretchability of the second composite web 44 and therefore of the composite sheet 1 can be substantially ensured.

When the second composite web 44, therefore the composite sheet 1 obtained in this manner is used as stock material for disposable garments such as disposable diapers or disposable gowns used in a medical site, it is not apprehended that a poor slidability peculiar to rubber-based material might stimulate the wearer's skin even if the second web contains the rubber-based stretchable material. The first continuous fibers 35 are stretched and thereby diameter-reduced, so these continuous fibers 35 correspondingly become comfortably softer than immediately after they have been discharged from the molder. Except the bond regions, the first continuous fibers 35 of the second composite web 44 are bonded neither with themselves nor with the second web 42 and a relatively small force required to stretch the second web 42 alone is sufficient as an initial force required to stretch the second composite web 44. Accordingly, the easily stretchable soft sheet is formed by the second composite web 44 in spite of its two-layered construction. The process according to the embodiment illustrated in FIG. 4 allows the first and second webs 41, 42 of the second composite web 44 to maintain their respective basis weights immediately after they have been discharged from the respective molders 31, 32. Both the first and second webs 41, 42 are assemblies of continuous fibers and therefore the second composite web 44 obtained from these two webs 41, 42 are generally breathable. In addition, there is no apprehension that the fibers might become fluffy and staple fibers might fall off even if the second composite web 44 is repetitively stretched and contracted. Elasticity of the second composite web 44 practically prevents formation of wrinkles after the web 44 has been folded. Such property is advantageous to use the composite sheet 1 as the stock material for the medical disposable gown.

The steps of the process for making the composite sheet 1 illustrated by FIG. 4 may be modified in various manners. For example, it is possible to feed the second 42 onto the belt 30 before the first web 41 is fed onto the belt 30. It is also possible to use, in addition to the pair of embossing rolls 34, the other means such as needle punching or high pressure columnar water streams in order to join the first and second webs 41, 42. Alternatively, a third molder can be provided downstream of the second molder 32 in FIG. 4 so that third melt blown continuous fibers discharged from this third molder may form a third web similar to the first web 41 on the second web 42 and thereby forma three-layered composite sheet 1 comprising, in addition to the first and second webs 41, 42 and the third web. The first web 41 and this third web may be either identical to each other or different from each other in type or resin, fineness, and appearance inclusive of color.

Figure 5:
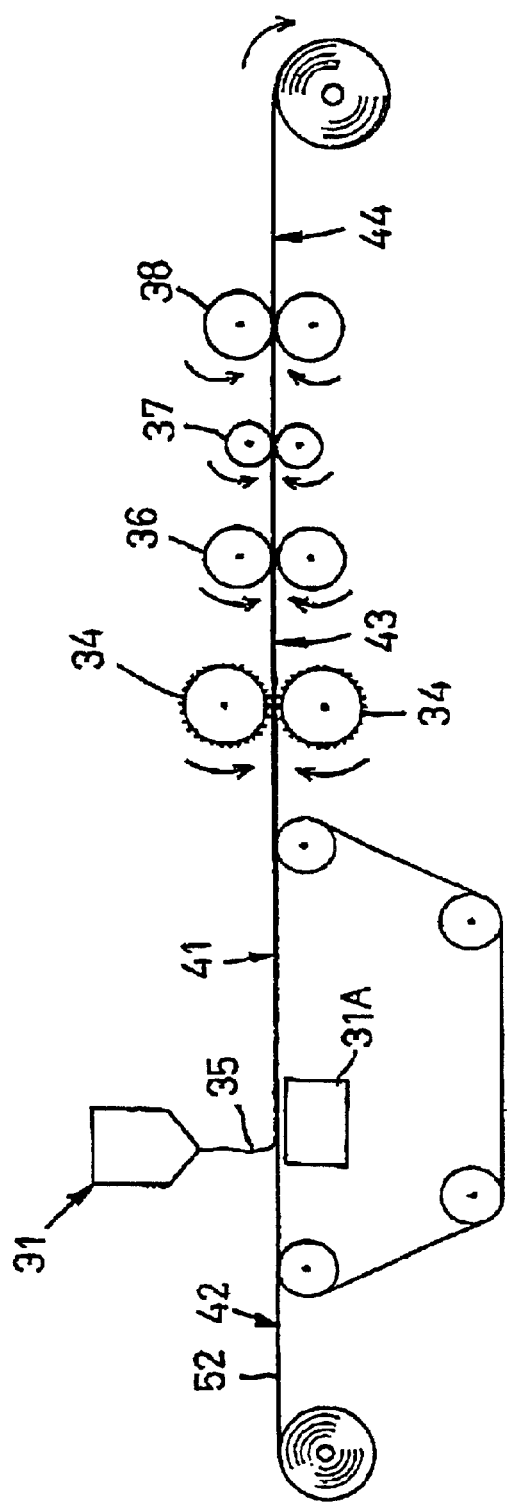
FIG. 5 is a diagram similar to FIG. 4 but illustrating another example of the process for making the composite sheet.

FIG. 5 is a diagram similar to FIG. 4 but illustrating another preferred embodiment of the process for making the composite sheet 1 of FIG. 2. According to this embodiment, a film 52 made of thermoplastic elastomer and having an elastic stretchability in the travelling direction of the belt 30 is fed as the second web 42 from the left hand of FIG. 5 and the first web 41 comprising the first continuous fibers 35 is fed onto the film 52. The first and second webs 41, 42 travel to the pair of embossing rolls 34, 34 in the same manner as in FIG. 4, between which the webs 41, 42 are intermittently bonded together to form the first composite web 43. This first composite web 43 is further stretched by the first—third pairs of rolls 36, 37, 38 and then contracted to form the second composite web 44. In the second composite web 44 having been formed with the bond regions 4 of FIG. 1 by bonding the first web 41 with the second web 42 in the form of the film 52, the first web 41 comprises continuous fibers like the second composite web 44 in FIG. 4. With this arrangement, the area of the individual bond regions 4 can be dimensioned as small as in the order of 0.03–1 $mm^2$ and/or the total area of the bond regions 4 can be also dimensioned as small as in the order of 1–50% of the area of the second composite web 44 without an apprehension that the first and second webs 41, 42 might be easily separated from each other. It should be understood that the area of the individual bond regions 4 may be selectively varied in a range of 0.03–10 mm' and/or the total area of these bond regions 4 may be selectively varied in a range of 1–50% of the area of the second composite web 44 without departing from the scope of this invention.

The steps illustrated by FIG. 5 can be modified so that the third melt blown fiber molder is used to feed the third continuous fibers onto the lower surface of the film 52 onto which the first continuous fibers 35 have been fed to obtain the composite sheet 1 of FIG. 3 having the film 52 sandwiched between two fibrous webs.

Figure 6:
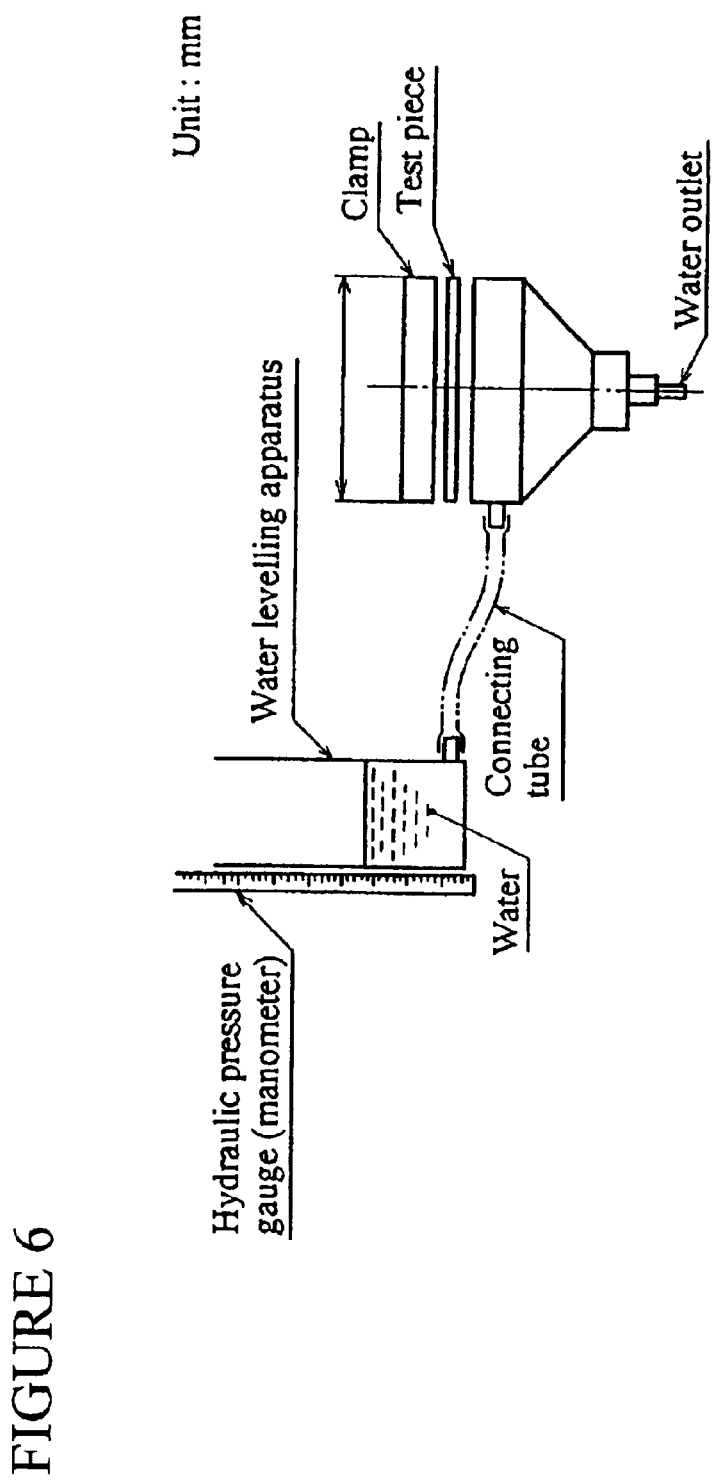
FIG. 6 is a schematic view of a testing device used in a testing method in accordance with Japanese Industrial Standards JIS L 1092.

In the following section, a testing method in accordance with JIS L 1092 will be discussed with reference to FIG. 6.

Method A (Low hydraulic pressure method) is as follows:
1) Apparatus and material. The following apparatus and material shall be used:
   1.1) Water penetration test apparatus (for low hydraulic pressure). The apparatus shown in FIG. 6 or those equivalent thereto whose rate of increase of water pressure is (60±3) cm/min and (10±0.5) cm/min. The clamp shall be of such size that he part of the test specimen which touches the water is 100 cm2.
   1.2) Hydraulic pressure gauge (manometer). With 0.5 cm scale and of approximately 1 m or higher in the maximum water level when raising the water leveling apparatus.
   1.3) Water. The distilled or ion-exchange water maintained at (20±2)° C. in the test shall be used and chosen alternative shall be stated in the test report. (Informative reference: Water temperature influences sometimes the test result).

Procedure. From the test specimens specified in 5, sample test pieces each measuring approximately 15 cm×15 cm, take five sheets of them for the following each test, mount the test pieces on the water penetration test apparatus shown in FIG. 6 in such a way that the front surface ([4]) touches the water, raise the water level by raising the water leveling apparatus containing water at a speed of (60±3) cm/min or (10±0.5) cm/min and measure the water level to an accuracy of cm at the time when the water comes out from the places on the reverse surface of the test pieces. The accuracy of the water level to be reported is:

| | |
|---|---|
| less then 1 m: | 0.5 cm |
| from 1 m and less than 2 m: | 1.0 cm |
| 2 m or more: | 2.0 cm |

Each result of five test pieces and the average value shall be expressed down to first decimal place. If the water does not come out from the three places even when the water level is raised, measure the water level at the time when the water comes out from one or two places and state that effect in the test report.

The extremely small water drops which do not grow after being formed and the water drops formed by penetrating through the same place shall be ignored.

Note ([4]) The front surface is the waterproofed surface or the surface the water touches at the time of use. (Informative reference: The test for water penetration, method A (Low hydraulic pressure method) is the same test method as that in ISO 811).

In the following section, a testing method in accordance with JIS Z 0208 will be discussed with reference to FIG. 7.

Testing Methods for Determination of the Water Vapour Transmission Rate of Moisture-Proof Packaging Materials (Dish Method)

Scope—This Japanese Industrial Standard specified the method using the water vapour transmission dish for testing the water vapour transmission rate of the moisture-proof packaging materials such as plastic film converted paper and the like.

Definition—The water vapour transmission rate is the quantity of vapour passing through the unit are of filmy substance for the definite hour. In this standard, when constituting the boundary surface by the moisture-proof packaging materials at the temperature of 25° C. or 40° C., and keeping the air of one side at a relative humidity of 90% and the air of the other side at the dry state by moisture absorbent, the value having converted the mass (g) passing through this boundary surface for 24 h into the value per 1 $m^2$ shall be defined as the water vapour transmission rate.

Because the affects of temperature and humidity on the water vapour transmission rate are not simple, the rate having been estimated from the measured value under the temperature and the humidity condition different from the testing condition as specified in this standard cannot be regarded as the water vapour transmission rate termed in this standard.

Apparatus

Water Vapour Transmission Dish. The water vapour transmission dish, hereinafter referred to as the "dish", shall meet the following conditions. An example of the dish and its accessories is shown in FIG. 7.

1) The area of water vapour transmission shall be not less than 25 cm2 and be capable of specifying its area clearly. The area of water vapour transmission shall be calculated from the inner diameter of the ring.
2) The quality of material shall have no permeability for the vapour and produce no corrosion and the like under the testing condition.
3) The dish shall have enough rigidity not to be transformed during operation.
4) The peripheral part of test piece shall be sealed completely.

Cover—Where the use of cover is required (see (10) under Operation, its cover shall be one capable of covering the one side of test piece completely and it is advisable that is material is same as that of cup.

Thermo-Hygrostat—The thermo-hygrostate shall be one in which the air kept at the specified temperature and humidity can circulate at a velocity of 0.5 to 2.5 m/s above the test piece. The temperature and humidity conditions at the time of test shall be as follows:

| | | |
|---|---|---|
| Condition A | Temperature: 25 ± 0.5° C. | Relative Humidity: 90 ± 2% |
| Condition B | Temperature: 40 ± 0.5° C. | Relative Humidity: 90 ± 2% |

Chemical Balance. The chemical balance shall be capable of weighing the mass of up to 0.1 mg.

Chemical Agents 4.1 Moisture Absorbent. The moisture absorbent shall be as specified in JIS K 8123. The absorbent having a grain size passing through the sieve of nominal size 2380 μm as specified in JIS Z 8801 and remaining on the 590 μm sieve shall be used.

4.2 Sealing Waxes. Use the sealing waxes meeting the following conditions. Further, it is preferable that the filler and the insoluble solid component are not included.

1) It shall be difficult to be peeled off and easy to be operated to seal with wax.

2) It shall be not fragile at room temperature and have no water absorption, nor hygroscopic property, nor fear of oxidation.

3) It is required that the sealing waxes are not softened and deformed when being exposed under the temperature and humidity condition B and the change in the mass of not less than 1 mg in 24 h is not produced, where its exposed surface area is 50 cm².

The following are examples of compounding (in mass ratio) of sealing waxes.

(a) Microcrystalline wax 60% and refined crystal paraffin wax 40%.

(b) Paraffin wax 80% having a melting point of 50 to 52° C. and viscous polyisobutylene (one having a low polymerization) 20%.

(c) Mixture of waxes having oil of 1.5 to 3% at a melting point of 60 to 75° C.

Test Piece—Take the test piece with sufficient cares to represent its sample, cut off not less than three test pieces, which have circular shape having a diameter larger by about 10 μm than the inner diameter of the cup to be used, from the same sample to offer the test.

Where the discrimination of the both top and bottom sides of test specimen is clear, the direction of the side of test pieces can be kept constant according to the use of that material when fitting the test piece with the cup. When measuring on the both sides, prepare not less than three test pieced on each side.

Figure 7:
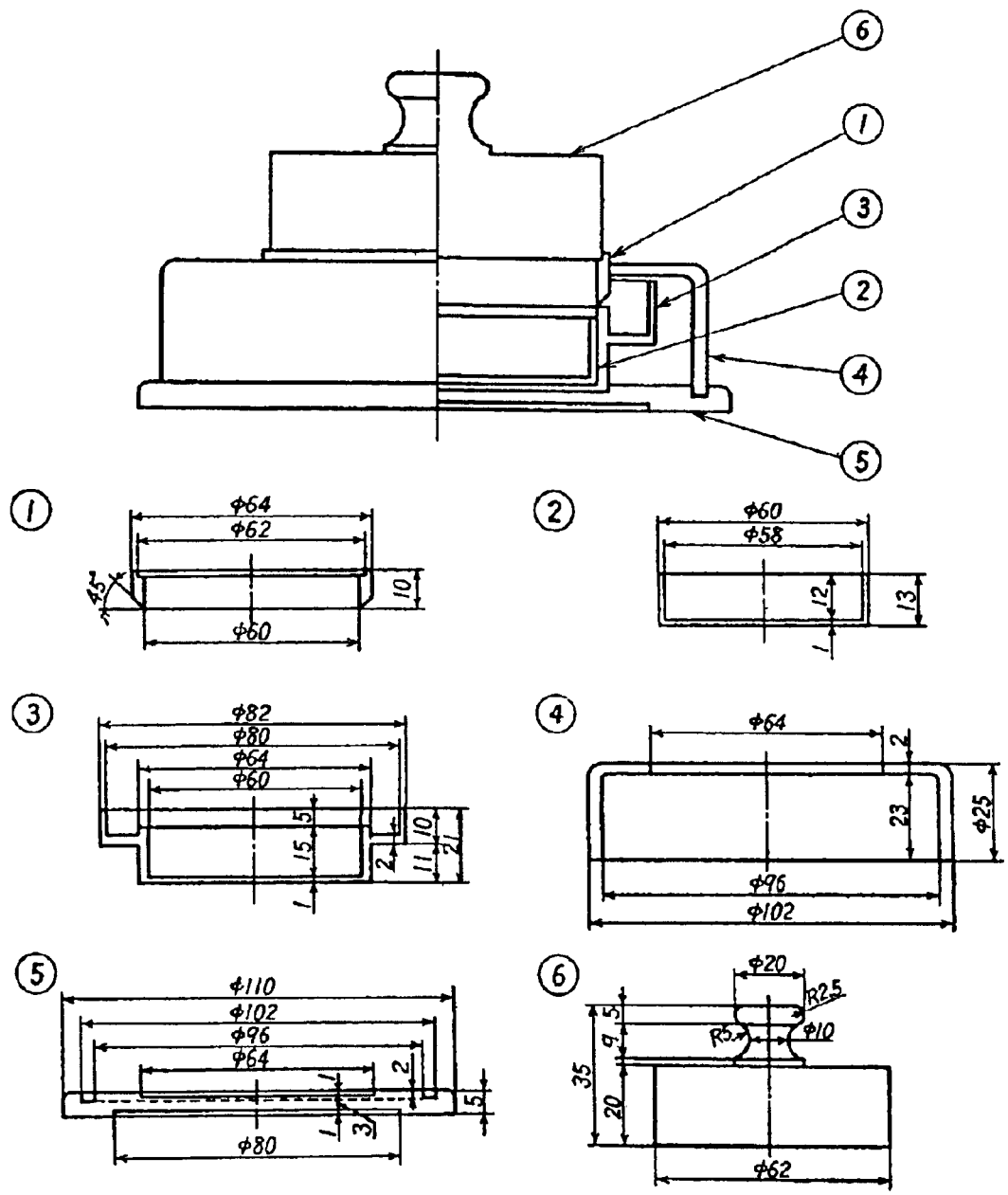
FIG. 7 is a schematic view of a testing device used in a testing method in accordance with Japanese Industrial Standards JIL Z 0208.

Operation—Where the cup as shown in FIG. 7 is used, fit the test piece with the cup by the following operation and carry out the test. Where other cup is used, carry out the test operation corresponding thereto.

1) Cleanse the cup and after having dried it, warm it up to a temperature of about 30 to 40° C.

2) Put the dish containing moisture absorbent in the cup and place it on the cup base kept horizontally. At this time, keep the surface of moisture absorbent horizontally as far as possible so that the distance from the underside of test piece will become about 3 mm.

3) Put the test piece on the position to become concentric with the cup.

4) Cover the guide to fit with the groove of cup base.

5) Push the ring in as shown in FIG. 7 until the test piece will contact closely with the upper edge of cup to fit the guide and put the weight on it.

6) Draw the guide perpendicularly up with cares not to move the ring to remove it.

7) While rotating the cup horizontally, flow the melted sealing waxes into the groove at the peripheral part of the cup and seal the edge of the test piece. The temperature of melted sealing wax shall not be the temperature likely to impair the measurement such as the part corresponding to the water vapour transmission area will melt or shrink. At this time, take care not to produce cracks, bubbles and others.

8) Remove the weight and the cup base after the sealing waxes have been solidified. Clean the sealing waxes that have been stuck to the part except the sealing part (sides and bottom of the cup and others) by the cloth with a suitable solvent soaked to remove and take as test specimen.

9) Put the test specimen in the thermo-hygrostat kept at the specified test condition.

10) After having placed the test specimen in the thermo-hygrostat not less than 16 h, take it out of the apparatus, let it keep balance with room temperature and measure the mass by the chemical balance. Where the side exposed to the outside of the test place is the material having a large hygroscopic property, cover the test specimen immediately after taking it out of the thermo-hygrostat apparatus to lessen the change of moisture content as far as possible. Where the test piece includes materials such as paper, paper-boards cellophane and the like has been exposed to the other direction, the use of cover is required.

11) Put the test specimen in the thermo-hygrostat again, take the cup out at a suitable time interval, repeat the weighing operation and measure the increase of the mass of cup. Obtain the mass increases per unit hour of consecutive two weighings respectively, continue this test until it will become constant within 5%.

The time interval of the weighings shall be 24, 28 or 96 h and its increase in mass shall be at least not less than 5 mg.

Moreover, it is necessary to compete the test before the moisture absorbent put in the cup has absorbed a moisture of 10% to its mass.

12) Where the water vapour transmission rate of sample is small or where the sample has a hygroscopic property, produce not less than two blank cups without the moisture absorbent by the same operation, add this to the test specimens to conduct the test similarly and it is desirable to correct the increased mass of test specimen at each time interval by the mean value of the mass change of the blank cup.

Calculation—Obtain the water vapour transmission rate from the following formula on each test specimen and round off it to two significant figures as specified in JIS Z 8401.

$$\text{Water vapour transmission rate (g/m}^2 \cdot 24 \text{ h)} = \frac{240 \times m}{t \cdot s}$$

where $s$: area of the water vapour transmission (cm²)

$t$: total of time intervals between the last two weighings (h)

$m$: total of increased masses betweeen the last two weighings (mg)

What is claimed is:

1. An elastically stretchable composite sheet, comprising:
   an elastic web having a stretchability in two different directions; and
   an inelastic assembly of fibers having an inelastic extensibility in said two directions and being bonded to at least one surface of said elastic web, wherein:
   said elastic web and said assembly are bonded together at bond regions arranged intermittently in said two directions, component fibers of said are long fibers each continuously extending and describing curves between adjacent said bond regions in which said long fiber is bonded to said elastic web.

2. The composite sheet according to claim 1, wherein said component fibers are neither sealed nor bonded with one another in bond-free regions between adjacent said bond regions.

3. The composite sheet according to claim 1, wherein said component fibers are independent one from another in said bond-free regions.

4. The composite sheet according to claim 1, wherein said component fibers describe loops in said bond-free regions.

5. The composite sheet according to claim 1, wherein said component fibers are stretched yarns made of polypropyrene or polyester.

6. The composite sheet according to claim 1, wherein each of said component fibers has a diameter of 0.1–50 µm.

7. The composite sheet according to claim 1, wherein said component fibers are continuous fibers.

8. The composite sheet according to claim 1, wherein said has a basis weight of 2–100 g/m$^2$.

9. The composite sheet according to claim 1, wherein said elastic web is made of an elastically stretchable film.

10. The composite sheet according to claim 9, wherein said elastically stretchable film is moisture-permeable.

11. The composite sheet according to claim 9, wherein said elastically stretchable film presents a moisture-permeability of at least 1000 g/m$^2$/24 hrs as measured according to JIS Z 0208, and a water pressure resistance of at least 1 m as measured according to JIS L 1092.

12. The composite sheet according to claim 9, wherein said elastically stretchable film is made of block copolymerized polyester comprising hard and soft ingredients and said soft ingredient is polyether or copolymer of polyether.

13. The composite sheet according to claim 1, wherein said elastic web is made of elastically stretchable continuous fibers, and said elastically stretchable continuous fibers are made of block copolymerized polyester comprising hard and soft ingredients and said soft ingredient is polyether or copolymer of polyether.

14. The composite sheet according to claim 1, wherein said composite sheet is elastically stretchable at least by 20% in said two directions.

15. The composite sheet according to claim 1, wherein said composite sheet consists essentially of said elastic assembly and said inelastic web.

16. The composite sheet according to claim 1, wherein said elastic web is a film.

17. A composite sheet, comprising:
an elastic web having a stretchability in two directions substantially orthogonal to each other; and
an assembly of fibers web having an inelastic extensibility in said two directions, said non-woven fibrous web being bonded to at least one surface of said elastic web at bonding regions arranged intermittently in said two directions, said comprising component fibers each continuously extending and describing curves in bonding-free regions defined between adjacent said bonding regions in which said component fiber is bonded to said elastic web.

18. The composite sheet of claim 17, wherein, in the bonding-free regions, said component fibers are separate from each other to be substantially free to reorientate and extend to describe substantially straight lines between adjacent said bonding regions when said composite sheet is stretched.

19. The composite sheet of claim 17, wherein, in the bonding-free regions, each of said component fibers, independently of the other component fibers, is substantially free to reorientate and extend to describe a substantially straight line between adjacent said bonding regions when said composite sheet is stretched.

20. The composite sheet of claim 17, having a stretchability substantially defined by the stretchability of said elastic web when said composite sheet is in a unstretched condition and when said composite sheet is stretched by a force which is sufficient to move adjacent said bonding regions away from each other in order to straighten said component fibers in the bonding-free regions, but insufficient to further stretch said straighten component fibers.

21. The composite sheet according to claim 17, wherein said composite sheet consists essentially of said elastic assembly and said fibrous web.

22. The composite sheet according to claim 17, wherein said elastic web is a film.

23. A composite sheet, comprising:
an elastically stretchable web; and
an inelastically extensible web made of a fibrous assembly, said inelastically extensible web being intermittently bonded to at least one surface of said elastically stretchable web.

24. The composite sheet according to claim 23, wherein all component fibers of said assembly generally extend in an MD direction of said composite sheet.

25. The composite sheet according to claim 23, wherein said assembly comprises component fibers that are randomly arranged in said assembly.

26. The composite sheet according to claim 23, wherein said composite sheet consists essentially of said elastically stretchable assembly and said inelastically extensible assembly.

27. The composite sheet according to claim 23, wherein said elastically stretchable web is a film.

28. The composite sheet according to claim 27, wherein said film is moisture-impermeable.

* * * * *